Jan. 25, 1966 T. R. CARRELL 3,231,289
SEALING GASKET
Filed Jan. 26, 1962
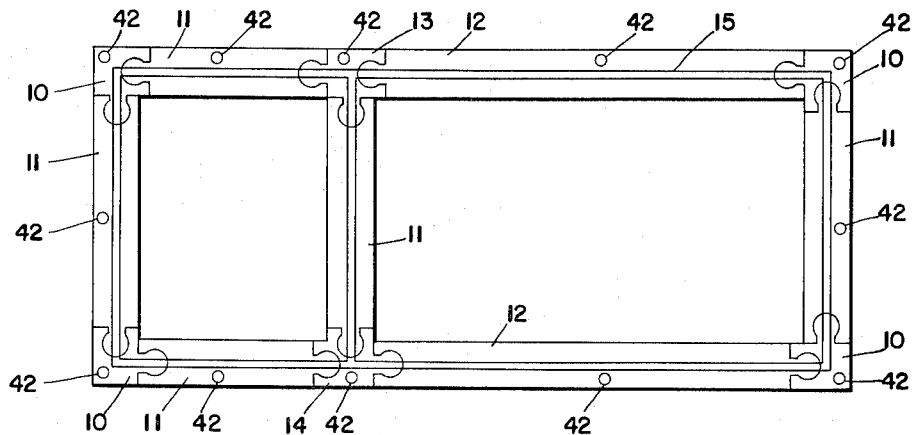
Fig. 1
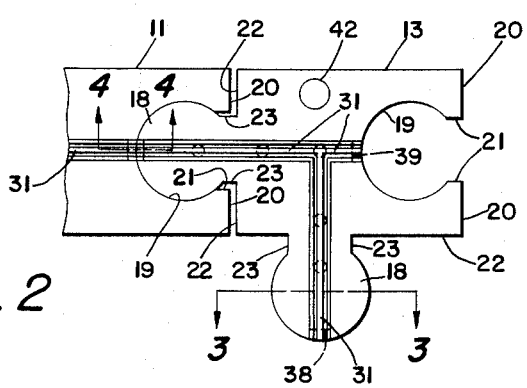
Fig. 2
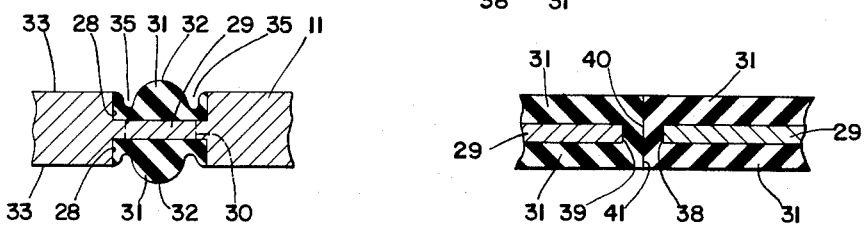
Fig. 3    Fig. 4
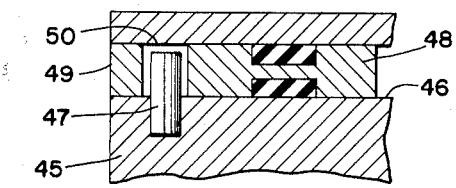
Fig. 5
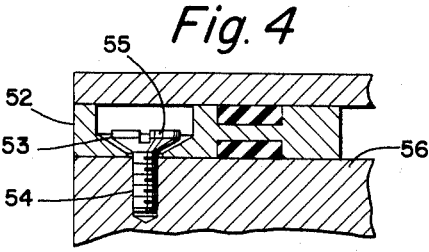
Fig. 6
INVENTOR.
THEODORE R. CARRELL
BY
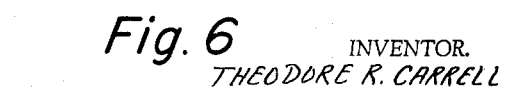
ATTORNEY

United States Patent Office 3,231,289
Patented Jan. 25, 1966

3,231,289
SEALING GASKET
Theodore R. Carrell, Los Angeles, Calif., assignor to Parker-Hannifin Corporation, Cleveland, Ohio, a corporation of Ohio
Filed Jan. 26, 1962, Ser. No. 168,957
6 Claims. (Cl. 277—180)

This invention relates to gaskets for sealing the joint between a pair of opposed members and more particularly relates to a multiple section gasket construction in which a number of gasket sections may be attached to each other to form a finished gasket of selected size and shape.

This invention has to do with gaskets of the type in which a body of metal or other rigid material carries a sealing strip of rubber-like resilient material. In such gaskets, the rigid portion is normally of one piece and the rubber-like material is bonded or otherwise attached thereto so that the entire gasket may be handled as a single piece. Such gaskets may be readily manufactured and handled when made in relatively small sizes and in certain shapes. However, it becomes quite impractical and too expensive to make such gaskets in large sizes and/or certain shapes, as for example, in square or rectangular shapes where the sides of the gasket may be several feet or more in length.

The present invention is concerned with the making of gasket sections which may be interlockingly attached to each other for making a completed gasket of selected size and shape.

One object of the invention is to form the interlocking connection between the sections in such manner that when interlocked the sections may have slight angular movement therebetween without affecting the sealing function.

It is another object to provide interlocking gasket sections having a rubber-like sealing strip on each side thereof and with such sealing strips joined at the interlocking connection so as to establish sealing contact between the two sections from one side to the other thereof at the interlocking connection.

It is another object to provide a gasket made up of interlocked sections in which means is provided for loosely securing the sections to one of the parts to be sealed, such loose attachment permitting slight angular motion between the interlocked sections.

It is another object to provide a corner section for a multiple section gasket in which the corner section has tongue and recess portions on legs disposed at right angles to each other, the legs being of minimum length.

Other objects of the invention will be apparent from the following description and from the drawings in which:

FIG. 1 is a plan view of a typical gasket made up from interlocking sections,

FIG. 2 is an enlarged plan view showing the interlocked connection between a pair of the gasket sections, FIG. 3 is a cross section along the lines 3—3 of FIG. 2, FIG. 4 is a cross section along the lines 4—4 of FIG. 2, FIG. 5 is a fragmentary cross section showing one method of locating the gasket sections between parts to be sealed, and FIG. 6 shows a method of securing the gaskets sections to one of the parts to be sealed.

The completed gasket shown in FIG. 1 is built up from a number of corner sections 10, straight sections 11 and 12, and branch sections 13 and 14. Each of the gasket sections carries a rubber-like sealing strip to form a resilient seal generally designated 15 and extending throughout the completed gasket.

As shown in FIG. 2, the interlocking connection between the gasket sections comprises a circular tongue 18 receivable within a circular recess 19 of an adjoining section. The tongues and recesses are a close fit so that when interengaged there can be no relative longitudinal or transverse movement between the sections.

Each recess 19 is open to the adjacent end surface 20 of the particular gasket section by means of an opening having straight parallel sides 21.

The tongue portion 18 projects from a base line 22 and includes straight parallel side portion 23. Straight portions 23 are spaced apart a distance less than straight portions 21 so that normally there is a clearance between adjacent straight portions 21 and 23. Likewise, end surfaces 20 and base line 22 are normally spaced from each other to form a clearance therebetween when a tongue is interlocked within a recess 19, as shown in FIG. 2. These clearances between straight portions 21, 23 and surfaces 20, 22, permit some angular movement of each gasket section with respect to the gasket section with which it is interlockingly engaged. This permits self alignment or adjustment of the various sections when interlockingly assembled to form a complete gasket.

As shown in FIG. 3, each gasket section has grooves 28 formed on opposite sides thereof in opposed relation with a thin web 29 therebetween. The web may have a series of openings 30 therein connecting the two grooves 28. A rubber-like sealing strip 31 is molded or otherwise formed and secured within grooves 28. When molded within the grooves, part of the rubber-like material flows into the openings 30 and integrally connects strips 31. A bead portion 32 of each strip initially projects beyond the corresponding face 33 of the metallic or rigid portion of the gasket section and is adapted to establish contact with the surfaces of the parts to be sealed. The projecting portion of beads 32 are adapted to be deformed so as to lie even with surfaces 33 with portions of the beads being displaced into voids or channels 35 initially formed in the rubber-like sealing strips.

The rubber-like sealing strips 31 in each of the gasket members terminates flush with the edge of the tongue 18 or recess 19, as the case may be. In addition, the webs 29 are notched as at 38 and 39 adjacent each tongue 18 and recess 19, respectively. Each notch 38, 39 is filled with rubber-like material integrally connected with the sealing strips 31 in the opposite grooves 28 so as to present continuous and straight end surfaces 40 and 41 at the edges of the tongues 18 and recesses 19, respectively. These end surfaces 40 and 41 tightly abut each other from end to end when the gasket sections are interlocked so as to establish a seal therebetween. Furthermore, these end surfaces 40 and 41 are formed on the same radius as the circular tongues and recesses and maintain their tight contact with each other when a tongue is angularly rotated a slight amount within its recess 19. The width of the bead portions 32 is such that one bead portion 32 will remain in end to end contact with an adjacent bead portion on another gasket section when one section is angularly rotated within a recess 19 of another section to the extent permitted before surfaces 20 and 22, or 21 and 23 contact to limit such rotation.

In order to provide corner sections 10 and branch sections 13 of simple construction and shape which may be easily manufactured and which have legs of minimum length, the base line 22 of each tongue 18 forms a straight and continuous side margin of the portion containing the recess 19.

Some or each of the gasket sections may have a hole 42 therethrough through which bolts may pass when bolts are used for drawing the parts to be sealed against opposite sides of the gasket.

As shown in FIG. 5, one part 45 having a surface 46 to be sealed by the gasket may have a pin or dowel 47 pressed or otherwise secured therein and projecting above surface 46 a distance less than the thickness of the rigid portion 48 of gasket section 49. Gasket 49 has a circular opening 50 therethrough of larger diameter than pin 47 for loosely receiving the latter. Pins 47 thus locate or position gasket 49 on part 45 and the loose fit of pin 47 in opening 50 permits the angular movement of tongues 18 within recesses 19 as previously described.

FIG. 6 shows another modification in which gasket sections 52 have a countersink shaped recess 53 for loosely receiving a threaded stud 54 having a head 55 which loosely secures or retains gasket section 52 to part 56. In this arrangement, stud 54 bottoms within or against part 56 before head 55 contacts the bottom of countersink 53 so that gasket section 52 can readily shift sidewise of stud 54.

Although several modifications of the invention have been illustrated and described, it is evident that other changes may be made in the detail construction of the parts without departing from the true scope of the invention as defined by the claims.

I claim:

1. In a sectional gasket, first and second sections each having flat opposed faces, said first section having a recess therein, said second section having a tongue interlockingly receivable within said recess, a groove in each face, the grooves in said first section intersecting said recess and the grooves in said second section extending across said tongue and in alignment with the grooves in said first section when the tongue is within said recess, a notch connecting the grooves of said first section at the edge of said recess and another notch connecting said grooves of said second section at the edge of said tongue, a rubber-like sealing strip in the grooves and notches of each section, said strips being sealingly engageable with each other at said notches across the entire thickness of said sections at said notches.

2. The gasket of claim 1 in which said tongue and recess are circular and the tongue is a snug fit within said recess, other portions of said sections having opposed faces with an initial clearance therebetween to permit relative pivoting motion between said sections about the center of said circular tongue and recess, said clearance being insufficient to permit movement of the strip in one of said sections to move out of engagement with the strip of the other section.

3. In a gasket, first and second rigid gasket sections, means connecting said first and second gasket sections to provide a separable interlocking pivotal connection therebetween, a clearance between portions of said sections adjacent the interlocking portions to permit relative angular movement between said sections, said sections each carrying a rubber-like sealing strip, said strips having ends in sealing engagement with each other when said gasket sections are connected together, said strips each having a width such that a portion of the end of one strip is maintained in contact with a portion of the end of the other strip to provide sealing engagement throughout the range of said relative angular movement.

4. In a sectional gasket, a first gasket section having a circular recess adjacent one end thereof and opening into said end, a second gasket section having a complementary circular tongue extending from an end thereof and receivable in said recess, said ends providing clearance therebetween when said tongue is in said recess whereby one of said sections may pivotally rotate a limited amount relative to the other section about the center of said circular tongue, said sections each carrying a rubber-like sealing strip, said strips having ends in sealing engagement with each other when said tongue is in said recess, said strips each having a width such that a portion of the end of one strip is maintained in contact with a portion of the end of the other strip to provide sealing engagement throughout the range of said relative angular movement.

5. A gasket in accordance with claim 4 in which the strip on the first section terminates flush with the edge of said recess and the strip on the second section terminates flush with the edge of said tongue.

6. A gasket in accordance with claim 4 in which the said ends of the strips are on a common radius from the center of the interlocked recess and tongue.

References Cited by the Examiner

UNITED STATES PATENTS

| | | | |
|---|---|---|---|
| 588,681 | 8/1897 | Leary | 277—199 |
| 1,835,139 | 12/1931 | Bullard | 277—137 |
| 1,986,465 | 1/1935 | Dempsey | 277—199 |
| 2,107,238 | 2/1938 | Des Roches | 287—103 |
| 2,251,195 | 7/1941 | Meunier | 277—199 XR |
| 2,437,900 | 3/1948 | Winkeljohn | 277—166 |
| 2,442,313 | 5/1948 | Price | 277—166 |
| 2,486,928 | 11/1949 | Cole | 277—182 |
| 2,722,043 | 11/1955 | Nenzell | 277—180 XR |

FOREIGN PATENTS 247,973   6/1912   Germany.

LAVERNE D. GEIGER, *Primary Examiner.*

SAMUEL ROTHBERG, *Examiner.*